(12) United States Patent
Yin et al.

(10) Patent No.: US 10,893,119 B2
(45) Date of Patent: *Jan. 12, 2021

(54) TIME-BASED DATA CACHING

(75) Inventors: Fenglin Yin, Lexington, MA (US); Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1700 days.

This patent is subject to a terminal disclaimer.

(21) Appl. No.: 13/477,643

(22) Filed: May 22, 2012

(65) Prior Publication Data

US 2013/0318191 A1 Nov. 28, 2013

(51) Int. Cl.
*H04L 29/08* (2006.01)
*G06F 16/957* (2019.01)
*H04L 29/06* (2006.01)

(52) U.S. Cl.
CPC ...... *H04L 67/2852* (2013.01); *H04L 67/2842* (2013.01); *H04L 67/2847* (2013.01); *G06F 16/9574* (2019.01); *H04L 69/28* (2013.01)

(58) Field of Classification Search
CPC ........................................ H04L 67/2842–2852
See application file for complete search history.

(56) References Cited

U.S. PATENT DOCUMENTS

| | | | |
|---|---|---|---|
| 6,553,409 B1 | 4/2003 | Zhang et al. | |
| 7,783,757 B2 * | 8/2010 | Plamondon | 709/225 |
| 8,533,170 B1 * | 9/2013 | McHugh et al. | 707/695 |
| 8,626,718 B2 * | 1/2014 | Rozensztejn et al. | 707/663 |
| 2003/0233423 A1 | 12/2003 | Dilley et al. | |
| 2003/0236826 A1 | 12/2003 | Islam et al. | |
| 2004/0068579 A1 * | 4/2004 | Marmigere | H04L 29/06 709/242 |
| 2004/0093592 A1 | 5/2004 | Rao | |
| 2004/0143626 A1 * | 7/2004 | Kemp et al. | 709/203 |
| 2006/0015570 A1 * | 1/2006 | Khemani | H04L 63/0485 709/217 |
| 2006/0020962 A1 | 1/2006 | Stark et al. | |
| 2006/0089917 A1 | 4/2006 | Strom et al. | |
| 2007/0124485 A1 * | 5/2007 | Frost et al. | 709/230 |
| 2007/0156966 A1 * | 7/2007 | Sundarrajan | G06F 12/0808 711/133 |

(Continued)

OTHER PUBLICATIONS

Wikipedia, Time to live, retrieved May 23, 2016, https://en.wikipedia.org/wiki/Time_to_live.*

(Continued)

*Primary Examiner* — Gregory G Todd

(57) ABSTRACT

A system is configured to receive, by a first server, a request, from a user device, for a first record stored by a cache associated with the first server, determine, a first timestamp associated with the first record, determine that the first record is invalid based on the first timestamp, and determine, based on determining that the first record is invalid, whether the first record is out of date with respect to a corresponding second record stored by a second server by comparing a second timestamp of the first record with a timestamp of the second record. The system is further configured to update the first record with information from the second record to form an updated first record when the first record is out of date, and to send the updated first record to the user device associated with the request.

21 Claims, 10 Drawing Sheets

(56) References Cited

U.S. PATENT DOCUMENTS

| | | |
|---|---|---|
| 2008/0209120 A1* | 8/2008 | Almog et al. ............... 711/106 |
| 2008/0242324 A1 | 10/2008 | Smuga et al. |
| 2009/0043881 A1* | 2/2009 | Alstad ......................... 709/224 |
| 2009/0293062 A1 | 11/2009 | Amir et al. |
| 2010/0005172 A1 | 1/2010 | Singer et al. |
| 2010/0026510 A1 | 2/2010 | Kiani et al. |
| 2010/0292816 A1 | 11/2010 | Anzures et al. |
| 2010/0325363 A1* | 12/2010 | Olesen et al. ............... 711/135 |
| 2012/0030275 A1* | 2/2012 | Boller et al. ................ 709/203 |
| 2012/0174204 A1* | 7/2012 | Sturm .................... G06F 21/31 726/7 |
| 2013/0124667 A1* | 5/2013 | Chow .............. G06F 17/30902 709/213 |
| 2013/0318191 A1* | 11/2013 | Yin et al. ..................... 709/213 |

OTHER PUBLICATIONS

Lurie, Jonathan, Develop a generic caching service to improve performance, Jul. 20, 2001, JavaWorld, http://www.javaworld.com/article/2075440/core-java/develop-a-generic-caching-service-to-improve-performance.html.*

Nudelman, Greg, The timestamp-based caching framework: Current data with peak performance, Jan. 3, 2005, JavaWorld, http://www.javaworld.com/article/2071825/build-ci-sdlc/the-timestamp-based-caching-framework--current-data-with-peak-performance.html.*

* cited by examiner

| Record ID | Description | Master record location | Master record timestamp | Cached record timestamp | TTL | Cached record expiry timestamp | Cached record up to date |
|---|---|---|---|---|---|---|---|
| 1234 | Entitlement rights | Platform accounts server | 1/2/2001 12 PM | 1/1/2001 12 PM | 2 HR | 1/1/2001 2 PM | |
| 5678 | Billing information | Partner accounts server | 10/31/2000 5 PM | 1/1/2001 5 PM | 1 MO | 2/1/2001 5 PM | X |
| 8901 | Billing credits | Partner accounts server | 12/31/2000 5 PM | 12/31/2000 5 PM | 1 Day | 1/1/2001 5 PM | X |
| 2345 | Login information | Partner accounts server | 12/1/2000 2 PM | 12/1/2000 2 PM | 2 MO | 2/1/2001 2 PM | X |

Fig. 5

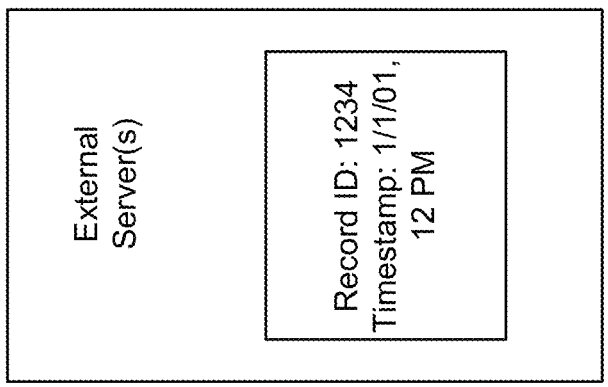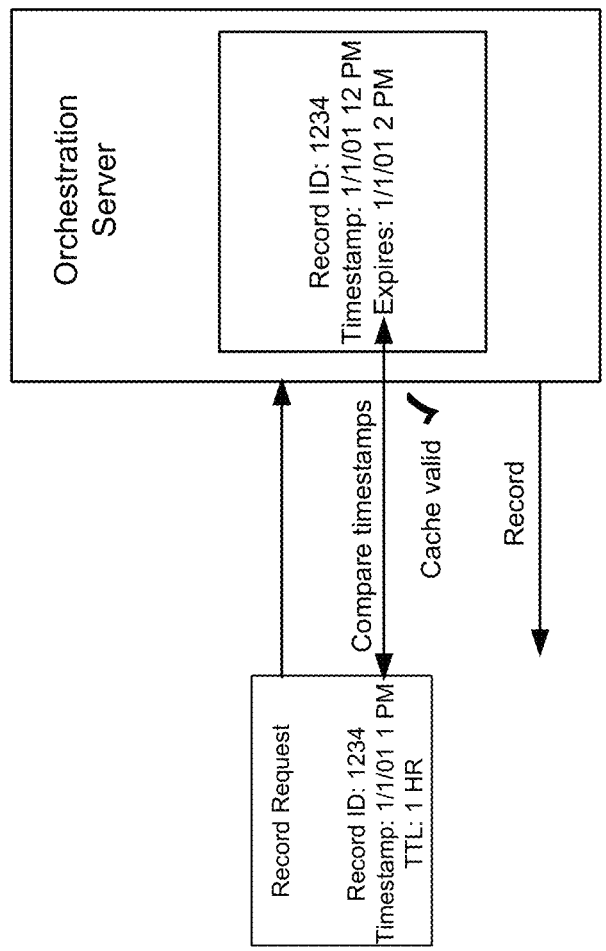
Fig. 7B

TIME-BASED DATA CACHING

BACKGROUND

A computing device may communicate with an external device to receive data. The computing device stores a copy (e.g., a cache) of data originated from the external device by using a caching process. Caching techniques may reduce network traffic by allowing the computing device to access the cached data while forgoing communications with the external device.

BRIEF DESCRIPTION OF THE DRAWINGS

FIG. 5 illustrates an example data structure that may be stored by one or more servers, such as an orchestration server;

FIGS. 7A-7C are diagrams illustrating example implementations described herein.

DETAILED DESCRIPTION OF THE PREFERRED EMBODIMENTS

The following detailed description refers to the accompanying drawings. The same reference numbers in different drawings may identify the same or similar elements.

The systems and/or methods, as described herein, may allow a local server (referred to as an "orchestration server") to store a copy of a master data record (referred to as a "cached data record") stored by one or more external servers. The systems and/or methods may also allow the orchestration server and/or some other device to communicate with the external servers to validate and/or update the cached data record against the corresponding master record in response to receiving an instruction to validate and/or update the data record (e.g., an instruction in the form of a request to receive the data record from a user device, in the form of an automated instruction to validate/update the data record, and/or in some other form).

The systems and/or methods may allow a user device to receive the data record (referred to as a "record") via the orchestration server, in order to streamline the transmission of the records, and/or to reduce network traffic associated with the user device receiving the records from the external server. The systems and/or methods may ensure that the cached records stored by the orchestration server are up to date with respect to the master records stored by the external server (e.g., by comparing a timestamp, associated with the cached record, with a timestamp, associated with the master record). In some implementations, the orchestration server may allow individual external servers to remain separate from one another (e.g., owned and/or operated by separate parties, such as separate companies, separate organizations, etc), while still allowing the user device to obtain the records originated from the external servers, via the orchestration servers.

In some implementations, the record may include information, such as authentication information, billing information, and/or some other information to authorize the user device to receive content (e.g., audio, video, images, documents, etc) from a content server. Additionally, or alternatively, the record may include information for some other purpose. As previously described, the master record may be stored by one or more external servers. In some implementations, the external servers may include a platform accounts server (e.g., a server for content platform provider), a partner accounts server (e.g., a server for a content reseller), and/or some other server. Based on receiving a request for the record from the user device, the orchestration server may determine if the cached record is up to date with respect to the corresponding master record, replace out-of-date records with up to date records, and provide up to date records to the user device.

Figure 1A:
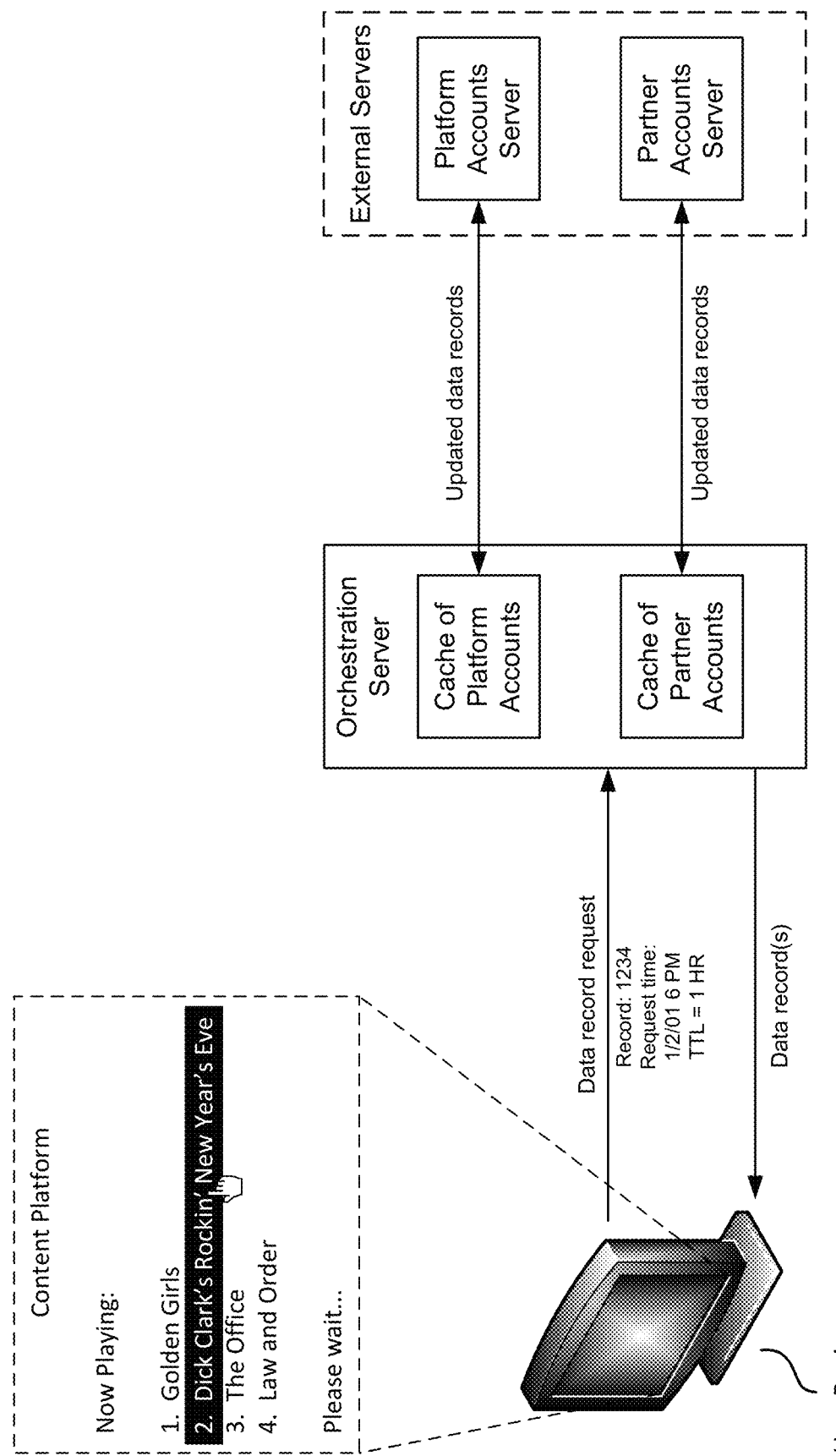
FIGS. 1A-1B illustrate an example overview of an implementation described herein.

FIG. 1A illustrates an example overview of an implementation described herein. As shown in FIG. 1A, a user may use a content platform, associated with a user device, to select to access video content and/or some other content (e.g., the television program "Dick Clark's Rockin' New Year's Eve"). Based on receiving a selection for content, the user device may initiate a request with the orchestration server to receive a record (e.g., to receive information to authorize the user device to receive the content from a content provider, such as a content server and/or content reseller). The request may include a header, which identifies information associated with the record and/or the record request (e.g., a record ID, a request time, and/or a time to live (TTL)).

As shown in FIG. 1, the orchestration server may store cached records based on receiving corresponding master records from one or more external servers (e.g., platform accounts server, partner accounts server, and/or some other server). Based on receiving the record request, the orchestration server may identify the record(s) corresponding to the request, determine the location of the record(s) (e.g., cache of platform accounts, cache of partner accounts, external platform accounts servers, external partner accounts servers, and/or some other location), validate/update the cached record(s) against the master record(s), compile/aggregate the record(s), and provide the record(s) to the user device.

Figure 1B:
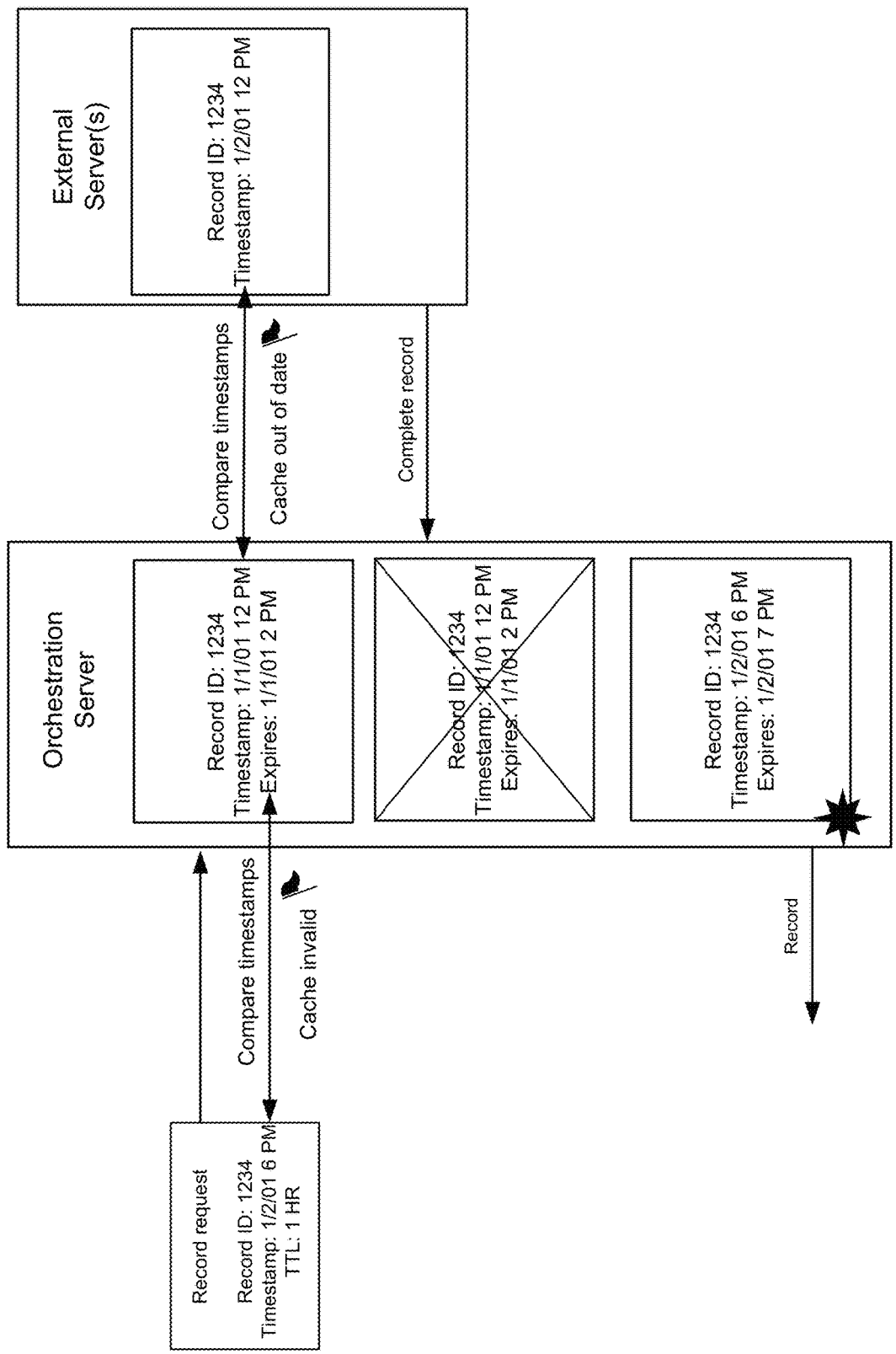

Continuing with the above example, and as shown in FIG. 1B, the orchestration server may determine if the cached record, associated with the record request, is valid by comparing the timestamp of the record request (e.g., 1/2/01, 6 PM) with a first timestamp (e.g., an expiry timestamp) associated with the cached record (e.g., 1/1/01 2 PM). In some implementations, the timestamp of the record request may be based on a current time in which the record request is received by the orchestration server. Based on comparing the timestamps, the orchestration server may determine that the cached record is invalid. Based on determining that the cached record is invalid, the orchestration server may communicate with the external servers to determine if the cached record is up to date with respect to the master record by comparing a second timestamp (e.g., a created timestamp) associated with the cached record (e.g., 1/1/01, 12 PM) with a timestamp of the master record (e.g., 1/2/01, 12 PM). In another implementation (e.g., when the expiry timestamp of the cache record is after the timestamp of the record request), the orchestration server may determine that the cached record is valid and forgo communicating with the external servers to receive an updated master record, thereby reducing network traffic.

In an example shown in FIG. 1B, the orchestration server may determine that the cached record is not up to date with respect to the master record. Based on this determination, the orchestration server may receive an indication (e.g., a flag and/or some other indication) that the cached record is out of date. In this case, the orchestration server may communicate with the external servers to receive a copy of the master record, delete the out-of-date record, and cache a new copy of the corresponding master record. The updated cache record may include a timestamp corresponding to the time when the record is updated (e.g., the timestamp of the record request) and/or an updated expiration time corresponding to the updated timestamp with the additional time defined by the TTL (e.g., 6 PM plus 1 hour corresponding to an expiration of 7 PM).

In some implementations, the TTL may be defined based on a user-defined parameter, a calculated parameter based on an algorithm, and/or some other parameter. For example, a longer TTL may correspond to a later expiration time associated with the cached record, which may reduce the instances in which the orchestration server communicates with the external servers, thereby reducing network traffic. In some other implementations, a shorter TTL may increase the number of instances where the orchestration server verifies the expiration of the cache record with respect to the master record, thereby increasing the chances that the cache record includes the most up to date information with respect to the master record.

While an example, shown in FIGS. 1A-1B, is described as returning a single record based on a single record request, in practice, a single record request may include a request for multiple records from multiple servers. In an implementation where a single record request includes a request for multiple records, the orchestration server may execute the process described above for each of the multiple records, compile/aggregate the multiple records, and send the aggregated records to the user device.

While systems and/or methods will be described in terms of caching data records in the context of providing a user device information to access content, the systems and/or methods are not so limited. For example, the systems and/or methods may be used to validate and/or update cached records and/or any other information for some other purpose (e.g., where cached records include authentication information to allow a device access to a server). Additionally, while the instruction to validate and/or update the cached record against the master record is described in the form of a record request from a user device, in practice, the instruction may be in some other form (e.g., an automated instruction based on an algorithm, and/or some other form).

Figure 2:
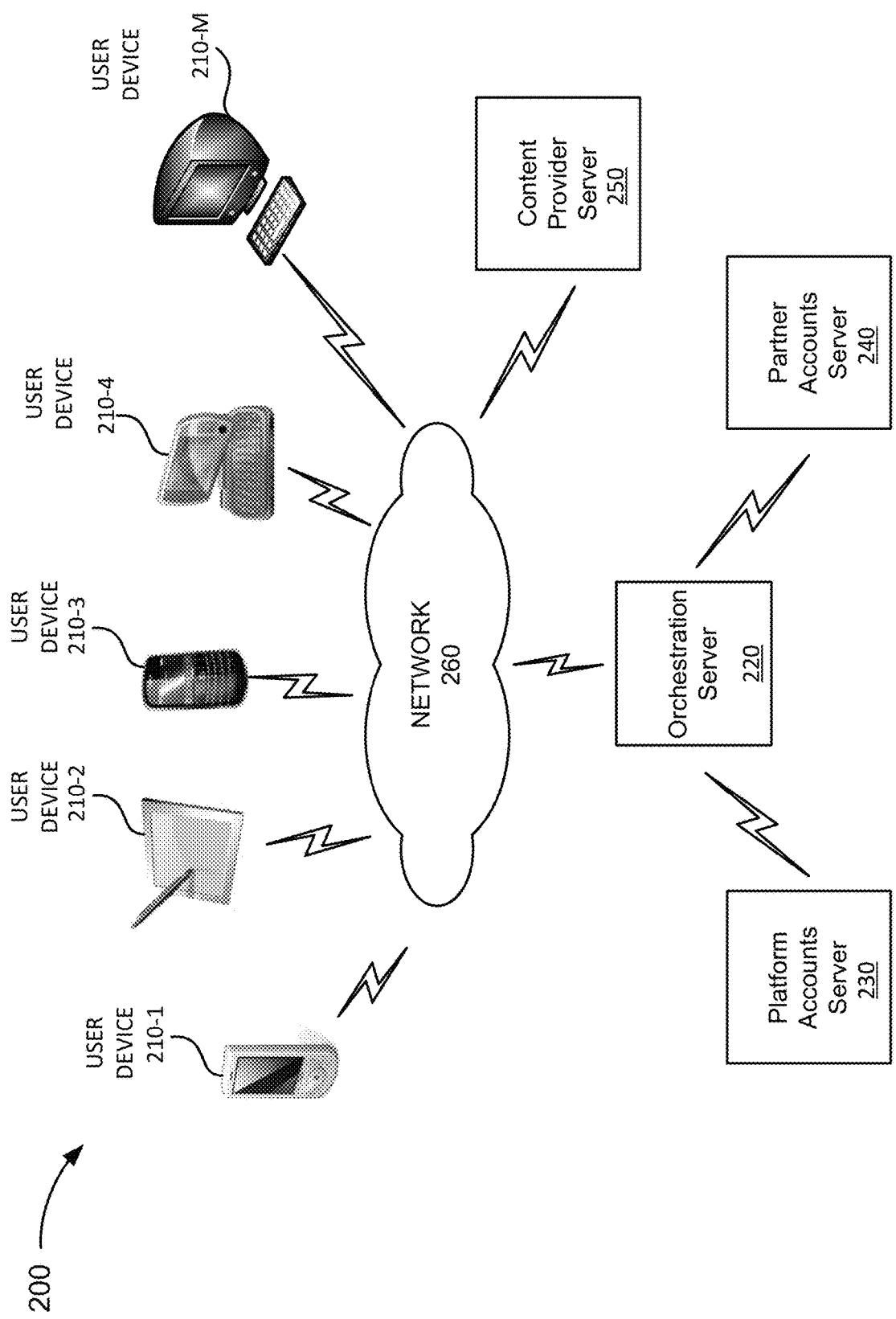
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include user devices 210-1, 210-2, . . . , 210-M (where M≥1) (collectively referred to as "user devices 210," and individually as "user device 210"), orchestration server 220, platform accounts server 230, partner accounts server 240, content provider server 250, and network 260. While FIG. 2 shows a particular number and arrangement of devices, in practice, environment 200 may include additional devices, fewer devices, different devices, or differently arranged devices than are shown in FIG. 2. For example, each of servers 220-250 may be implemented as multiple, possibly distributed, devices. Alternatively, two or more of servers 220-250 may be implemented within a single device. Further, a function described as being performed by one server may be performed by another server.

User device 210 may include any portable or non-portable device capable of communicating via a network, such as network 260. For example, user device 210 may correspond to a mobile communication device (e.g., a mobile phone or a personal digital assistant (PDA)), a portable computer device (e.g., a laptop or a tablet computer), or another type of portable device. User device 210 may also, or alternatively, include a client device such as a set top box for a television, a digital video recorder (DVR) or player, a desktop computer, a gaming device, or the like.

Orchestration server 220 may include a computing device, such as a server device. In some implementations, orchestration server 220 may include a server device that may receive and/or store copies of records (e.g., cached records) corresponding to master records and/or some other information stored by one or more external server devices, such as servers 230 and 240. For example, orchestration server 220 may store cached records associated with information to allow user device 210 to access content from a content provider server 250, such as content entitlement rights, content subscription information, parental controls, billing information, content access history information, etc. Orchestration server 220 may store timestamps associated with the cached records, and determine invalid cached records (e.g., cached records with expiry timestamps before a current time and/or before a timestamp associated with a record request). Additionally, or alternatively, orchestration server 220 may identify out-of-date records with respect to corresponding master records. Additionally, or alternatively, orchestration server 220 may automatically delete out-of-date cached records and replace out-of-date cached records with new copies of corresponding master records. Orchestration server 220 may communicate with user device 210 to fulfill requests for records from user device 210, and provide user device 210 with records based on the requests from user device 210.

Platform accounts server 230 may include a computing device, such as a server device or a collection of server devices. In some implementations, platform accounts server 230 may include a server device that receives and/or stores information associated with user account information for a content delivery platform. For example, platform accounts server 230 may receive and/or store records with information associated with a user account. In some implementations, the records stored by platform accounts server 230 may include information to allow user device 210 to access content from a content provider server 250. For example, platform accounts server 230 may include records with information, such as user device types (game consoles, mobile phones, tablets, desktop computers, portable computers, etc), content entitlement rights (content subscriptions, rentals, purchases, permission levels for accessing particular content), parental controls, content purchase/rental history, and/or some other information.

Partner accounts server 240 may include a computing device, such as a server device or a collection of server devices. In some implementations, partner accounts server 240 may include a server device that receives and/or stores information associated with user account information for a content delivery reseller. For example, partner accounts server 240 may receive and/or store records with information associated with a user account. In some implementations, the records stored by partner accounts server 240 may include information to allow user device 210 to receive content from content provider server 250. For example, partner accounts server 240 may include records, such as billing information, subscription credits, login credentials, and/or some other information. Partner accounts server 240 may be associated with a party different from a party associated with platform accounts server 230. Additionally or alternatively, environment 200 may include multiple partner accounts servers 240. In this case, each partner accounts server 240 may be associated with a respective party, which may differ.

In one implementation, the interactions between servers 220-240 may be performed using the hypertext transfer protocol (HTTP) or the secure HTTP (HTTPS). In one implementation, the interactions between servers 220-240 may be performed using another type of protocol.

In practice, it will be apparent that, at any given time, platform accounts server 230 may also act as a partner accounts server 240. Additionally, or alternatively, platform accounts server 230 and/or partner accounts server 240 may perform the functions of both a platform accounts server 230 and as a partner accounts server 240.

Content provider server 250 may include a computing device, such as a server device or a collection of server devices. In one implementation, content provider server 250 may include a server that stores, processes, and/or delivers content to user device 210. Content provider server 250 may store content, such as broadcast content, on demand content, web content, and/or some other content. Additionally, or alternatively, content provider server 250 may include content from a content originator and/or a content reseller. Content provider server 250 may store content in encrypted form or unencrypted form. Additionally or alternatively, content provider server 250 may permit user device 210 to access content once user device 210, has been properly authenticated (e.g., based on information associated with a record received by user device 210 from servers 220-240).

Network 260 may include any type of network or a combination of networks. For example, network 260 may include a LAN, a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic (e.g., FiOS), or a combination of networks. Each of user device 210, orchestration server 220, platform accounts server 230, partner accounts server 240, and/or content provider server 250 may connect to network 260 via a wireless connection, a wired connection, or a combination thereof.

Figure 3:
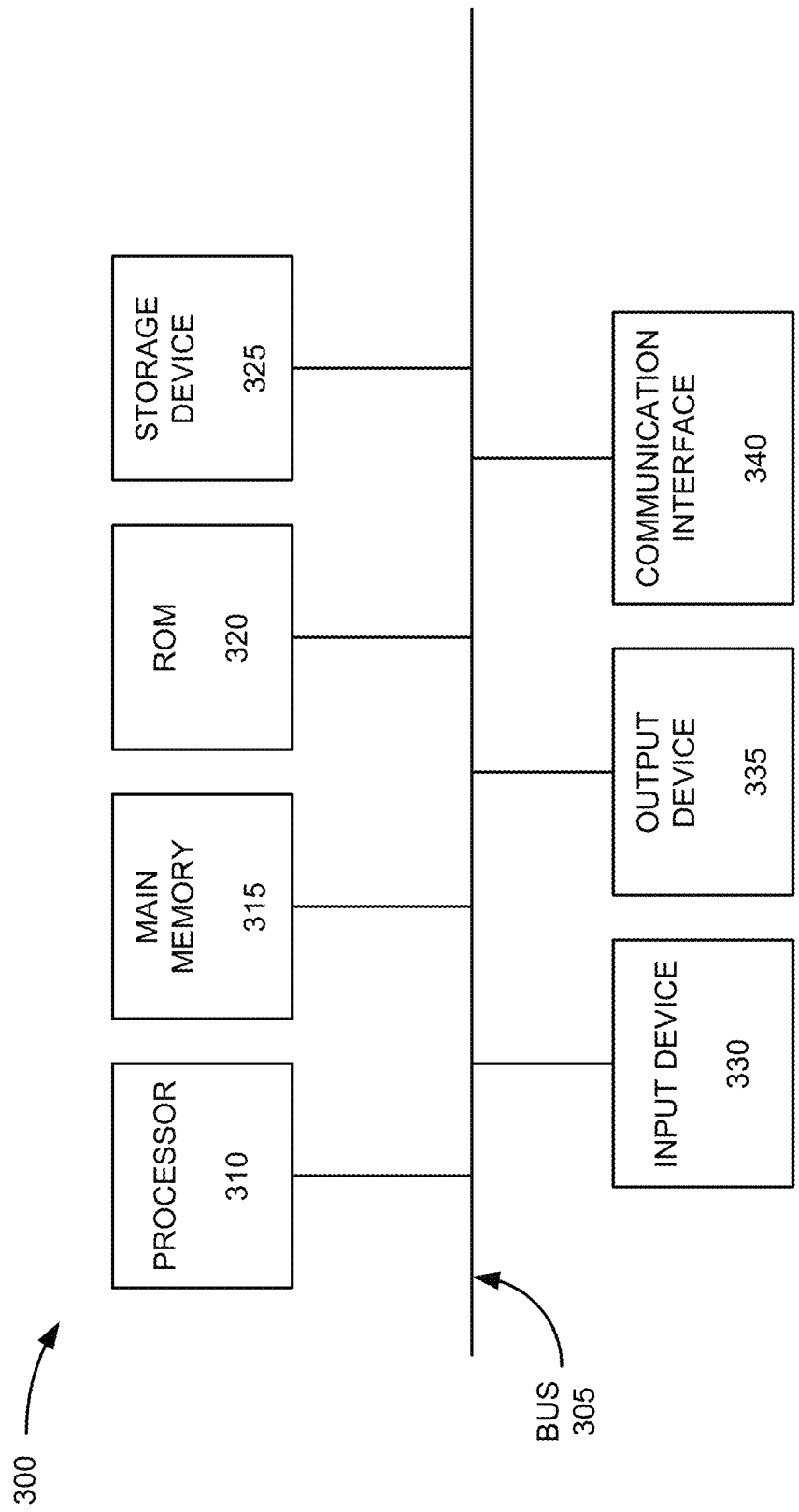
FIG. 3 illustrates example components of a device that may be used within the environment of FIG. 2.

FIG. 3 illustrates example components of a device 300 that may be used within environment 200 of FIG. 2. Device 300 may correspond to user device 210 and/or servers 220-250. Each of user device 210 and/or servers 220-250 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
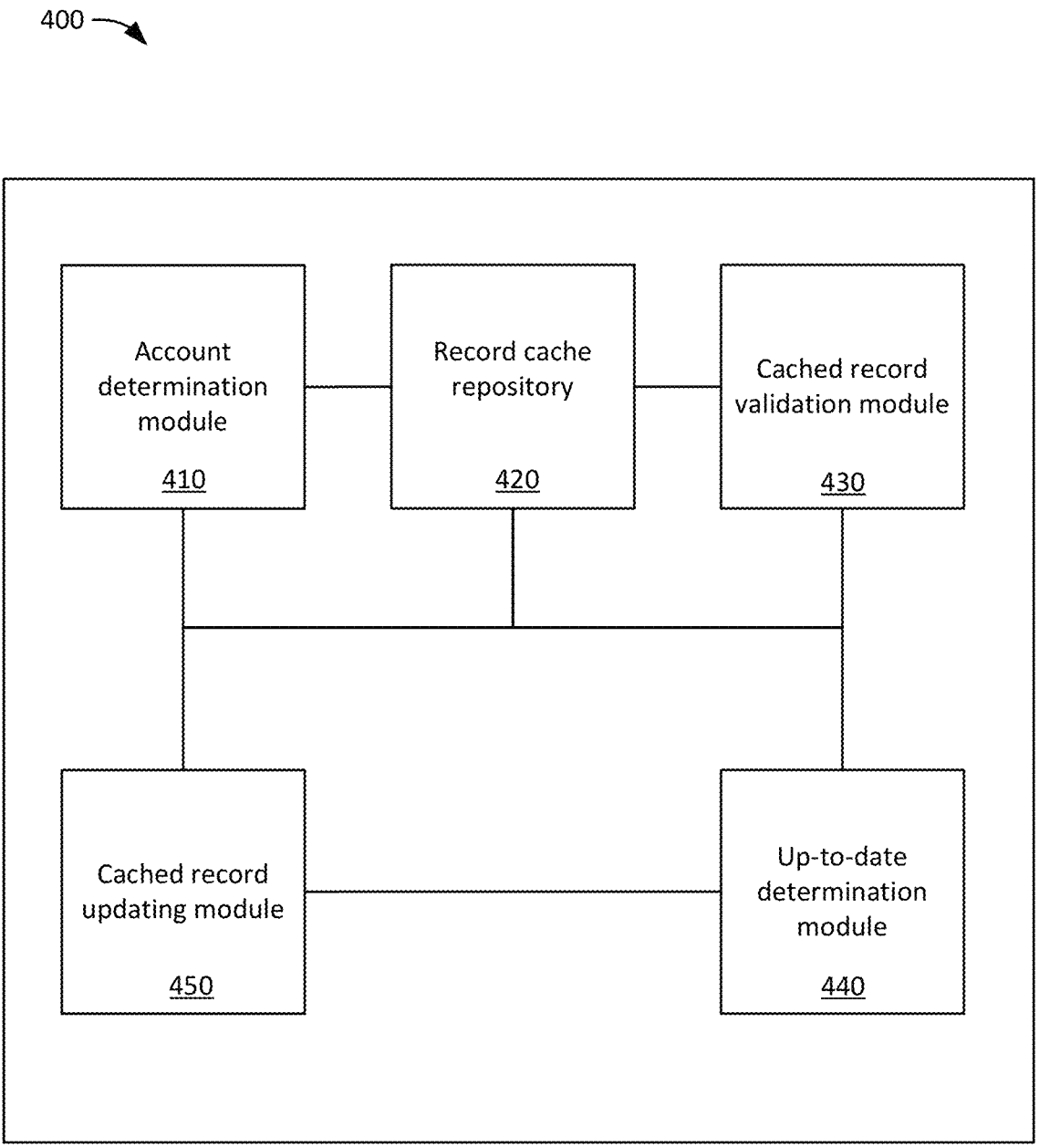
FIG. 4 illustrates example functional components of an example system.

FIG. 4 illustrates example functional components of an example system 400. System 400 may include functional components implemented by orchestration server 220. In another implementation, system 400 may include functional components implemented by one or more devices, which include or exclude orchestration server 220. For example, servers 230 and 240 may include some or all of the functional components of system 400.

As shown in FIG. 4, system 400 may include account determination module 410, record cache repository 420, cached record validation module 430, up-to-date determination module 440, and/or cached record updating module 450. In some implementations, system 400 may include fewer, additional, or different modules. Any, or all, of modules 410-450 may be implemented by one or more memory devices (such as main memory 315) and/or one or more processors (such as processor 310). Furthermore, multiple modules 410-450 may be associated with the same memory device and/or processor (e.g., one memory device, or one set of memory devices, may store information associated with two or more of modules 410-450).

In some implementations, account determination module 410 may receive a record request from user device 210. As described above, user device 210 may request a record to obtain information to access content from a content provider server, such as content provider server 250. Additionally, or alternatively, user device 210 may request a record for some other purpose. In one implementation, the record request may include a header with a record ID, timestamp, and TTL. In another implementation, the record request may include additional data, less data, or other data. For example, in another implementation, the record request may not include a timestamp and/or a TTL. Module 410 may receive the record request and identify the accounts associated with the record request (e.g., platform accounts, partner accounts and/or some other account).

Record cache repository 420 may be implemented by one or more memory devices. Record cache repository 420 may receive and/or store a cache of a record corresponding to a master record stored by one or more servers, such as servers 230 and 240. For example, repository 420 may receive and/or store a cache of a master record stored by platform accounts server 230 (e.g., content entitlement rights, parental controls, content purchase/rental history, and/or some other information) and/or partner accounts server 240 (e.g., login credentials, subscription credits, billing information, and/or some other information). In one implementation, cached records for servers 230 and 240 may be stored separately within record cache repository 420. In some other implementation, cached records for servers 230 and 240 may be stored together (e.g., comingled) within record cache repository 220. As described above, a cached record may include a first timestamp (e.g., an expiry timestamp) describing when the cached record is no longer valid (e.g., a record that may need to be updated with a corresponding master record). Additionally, or alternatively, a cached record may include a second timestamp (e.g., a created timestamp) describing when the cached record corresponding to the master record was created and/or stored by repository 420.

Cached record validation module 430 may validate a cached record. For example, module 430 may receive a record request from module 410 and compare a timestamp associated with the record request with an expiry timestamp associated with a corresponding cached record. The timestamp, associated with the record request, may be included in the record request or may be generated to identify the time at which the record request was received by orchestration server 220. In an example described above with respect to FIG. 1B, module 430 may determine that a cached record is invalid, based on determining that the timestamp associated with the record request is after the expiry timestamp of the cached record (e.g., the timestamp of the record request (1/2/01, 6 PM) is after the expiry timestamp of the cached record (1/2/01, 2 PM)). In some other example, module 430 may determine that a cached record is valid when the timestamp of the record request is before the expiry timestamp of the cached record).

Up-to-date determination module 440 may receive an instruction from module 430 to determine if a cached record is up to date with respect to the corresponding master record (e.g., if the created timestamp associated with the cached record is up to date with respect to the corresponding master record). For example, module 440 may communicate with one or more of servers 230 and 240 to compare the created timestamp of the cached record with the timestamp of the master record. In some implementations, the timestamp of the master record may update based on a change associated with the master record. In some implementations, functions described as being performed by module 440 may be omitted in an example where module 430 determines that a cached record is valid.

In an example implementation, module 440 may receive information from module 410 to identify which server(s) store the master record associated with the cached record. For example, module 440 may determine that the master record is stored by platform accounts server 230, thereby reducing network traffic by allowing module 440 to forgo communicating with partner accounts server 240.

In an example implementation described above with respect to FIG. 1B, module 440 may determine that the cached record is out of date with respect to the master record, based on comparing the created timestamp of the cached record with the timestamp of the master record (e.g., the timestamp of the cached record (1/1/01, 12 PM) is before the timestamp of the master record (1/2/01, 12 PM)). In some other example, module 440 may determine that the cached record is up to date when the created timestamp of the cached record is after the timestamp of the master record.

Cached record updating module 450 may execute instructions to update a cached record based on information received from modules 430 and 440. For example, module 450 may receive information from module 430 to determine if the cached record is valid. Additionally, or alternatively, module 450 may receive information from module 440 to determine if the cached record is up to date with respect to the master record. For example, module 450 may identify an up-to-date cached record associated with the record request, and replace an outdated cached record with a copy of the corresponding master record. Additionally, or alternatively, module 450 may aggregate, organize, and/or package updated records in response to a record request and/or in response to some other instruction (e.g., in an implementation in which the record request includes requests for multiple records originated from multiple servers). For example, module 450 may aggregate the up-to-date cached records in a manner that allows a device (e.g., user device 210), to receive the records associated with the record request. Additionally, module 450 may send the record(s) to the device (e.g., user device 210) associated with the record request.

In some implementations, module 450 may receive an indication from module 430 that the cached record is invalid. Additionally, module 450 may receive an indication from module 440 that the cached record is out of date with respect to the master record. In this case (e.g., where the cached record is out of date with respect to the master record), module 450 may delete the outdated cached record and communicate with one or more servers 230 and 240 to cache a new copy of the master record. Additionally, module 450 may create a created timestamp and/or an expiry timestamp associated with the newly cached record. In some implementations, the created timestamp may be based on the timestamp of the record request. Additionally, or alternatively, the expiry timestamp may be based on the timestamp of the record request and/or the TTL. For example, the expiry timestamp may be generated by adding the TTL to the timestamp associated with the record request (e.g., a record request timestamp of 5 PM and a TTL of 1 HR will cause module 450 to generate an expiry timestamp of 6 PM). An example of module 450 deleting an out-of-date cached record, caching new copy of the corresponding master record, and creating timestamps for the newly cached record is described above with respect to FIG. 1B.

In some other implementation, module 450 may receive an indication from module 430 that the cached record is invalid. Additionally, module 450 may receive an indication from module 440 that the cached record is up to date with respect to the master record. In this case, (e.g., where the cached record is invalid and up to date) module 450 may update the expiry timestamp of the record. As described above, the expiry timestamp may be updated based on the timestamp of the record request and/or the TTL. As a result, module 450 may forgo communicating with servers 230 and 240 to cache a new copy of the master record.

FIG. 5 illustrates an example data structure 500 that may be stored by one or more servers, such as orchestration server 220. In one implementation, data structure 500 may be stored in a memory of orchestration server 220. In another implementation, data structure 500 may be stored in a memory separate from, but accessible by, orchestration server 220. Orchestration server 220 may store multiple data structures 500 associated with records as described above, and/or with some other information. A particular instance of data structure 500 may contain different information and/or fields than another instance of data structure 500.

As shown in FIG. 5, data structure 500 may include record ID field 510, description field 520, master record location field 530, master record last modified timestamp field 540, cached record timestamp field 550, cached record expiry timestamp field 560, and cached record up to date field 570. In some implementations, data structure 500 may include additional fields, fewer fields, different fields, or differently arranged fields than are shown in FIG. 5. Information stored by data structure 500 may allow orchestration server 220 to identify records by record ID, and may allow orchestration server 220 to locate the data associated with the records.

Record ID field 510 may store information to identify a record associated with information to allow user device 210 to receive content from a content provider server, such as content provider server 250. Additionally, or alternatively, record ID field 510 may identify a record associated with some other information for some other purpose. In an example shown in FIG. 5, record ID field 510 may store a numerical value such as "1234." In practice, record ID field 510 may store any character string to identify corresponding information in a manner such that no two record IDs are the same.

Description field 520 may include a narrative which summarizes the type of information stored by a corresponding record. For example, as shown in FIG. 5, description field 520 may indicate that the record associated with record ID "1234" stores information associated with entitlement rights, such as information identifying whether user device 210 is entitled to access particular content (e.g., subscription information, rental/purchase information, download/streaming permissions, asset quality (high definition quality, standard definition quality), and/or some other information). Additionally, or alternatively, description field 520 may identify some other type of information associated with a record (e.g., billing information, billing credits, authentication information, and/or some other information).

Master record location field 530 may include information identifying a server (e.g., platform accounts server 230 or partner accounts server 240) responsible for the master record. For example, as shown in FIG. 5, field 530 may indicate that the master record associated with record ID "1234" is stored by platform accounts server 230. As further shown in FIG. 5, master record location field 530 may indicate that the master record associated with record ID "5678" is stored by partner accounts server 240. As described above, orchestration server 220 may use information from master record location field 530 to identify the server responsible for a master record so that orchestration server 220 can forgo communicating with a server that does not store a record associated with a record request.

Master record timestamp field 540 may include information identifying a date and/or time in which a master record was created and/or changed. For example, as shown in FIG. 5, master record timestamp field 540 may indicate that the master record associated with the record ID "1234" was created and/or changed on 1/2/2001 at 12 PM. As further shown in FIG. 5, master record timestamp field 540 may indicate that the master record associated with record ID "5678" was created and/or changed on 10/31/2000 at 5 PM. Information in field 540 may be automatically received by orchestration server 220 from the corresponding server associated with the master record. Orchestration server 220 may use master record timestamp field 540 to automatically determine if the corresponding cached record is up to date. Additionally, or alternatively, orchestration server 220 may delete an out-of-date cached record and replace it with a new copy of the corresponding master record. Additionally, or alternatively, data structure 500 may not include master record timestamp field 540. In this case, orchestration server 220 may receive a master record timestamp in response to processing a record request.

Cached record timestamp field 550 may include information identifying a date and/or time in which a cached record was created and/or changed. For example, as shown in FIG. 5, cached record timestamp field 550 may indicate that the cached record associated with the record ID "1234" was created and/or changed on 1/1/2001 at 12 PM. As further shown in FIG. 5, cached record timestamp field 550 may indicate that the cached record associated with record ID "5678" was created and/or changed on 1/1/2001 at 5 PM.

TTL field 560 may include a TTL value used to determine a cached record's expiry timestamp. For example, the TTL value may be set on a per-record basis, based on the type of record (e.g., entitlement rights, login information, etc), based on the server that stores the corresponding master record, etc. Additionally, or alternatively, the TTL may be set by an administrator of a record and may be set based on optimizing trade-offs associated with different TTL values. For example, a larger TTL value may correspond to later cache record expiration times, thereby reducing instances in which orchestration server 220 communicates with one or more servers 230 and 240. Alternatively, a smaller TTL value may correspond to more communications between orchestration server 220 and one or more servers 230 and 240, thereby increasing the chances that the cached record is up to date with respect to the master record. In some implementations, the TTL value may be equal to zero, indicating that orchestration server 220 may communicate with one or more of servers 220-230 each time that a record request is received.

Cached record expiry timestamp field 570 may include information identifying a date and/or time in which a cached record is set to expire (e.g., become invalid). As described above, the expiry timestamp may be based on a timestamp associated with a record request, a cached record created timestamp, and/or a TTL. For example, as shown in FIG. 5, cached record expiry timestamp field 560 may indicate that the cached record associated with the record ID "1234" is set to expire on 1/1/2001 at 2 PM, corresponding to the sum of the cached record created timestamp and the TTL. As further shown in FIG. 5, cached record expiry timestamp field 560 may indicate that the cached record associated with record ID "5678" is set to expire on 2/1/2001 at 5 PM.

Cached record up to date field 580 may store information identifying out-of-date cached records with respect to corresponding master records. For example, as shown in FIG. 5, cached record up to date field 570 may indicate that the cached record associated with record ID "1234" is not up to date with the corresponding master record. In some implementations, orchestration server 220 may determine if the cached record is up to date with the corresponding master record in response to receiving an instruction to check if the cached record is up to date. Additionally, or alternatively, orchestration server 220 may automatically check if the cached record is up to date without receiving an instruction. Additionally, or alternatively, a server associated with the master record (e.g., platform accounts server 230 and/or partner accounts server 240) may automatically notify orchestration server 220 when the master record has changed.

Figure 6:
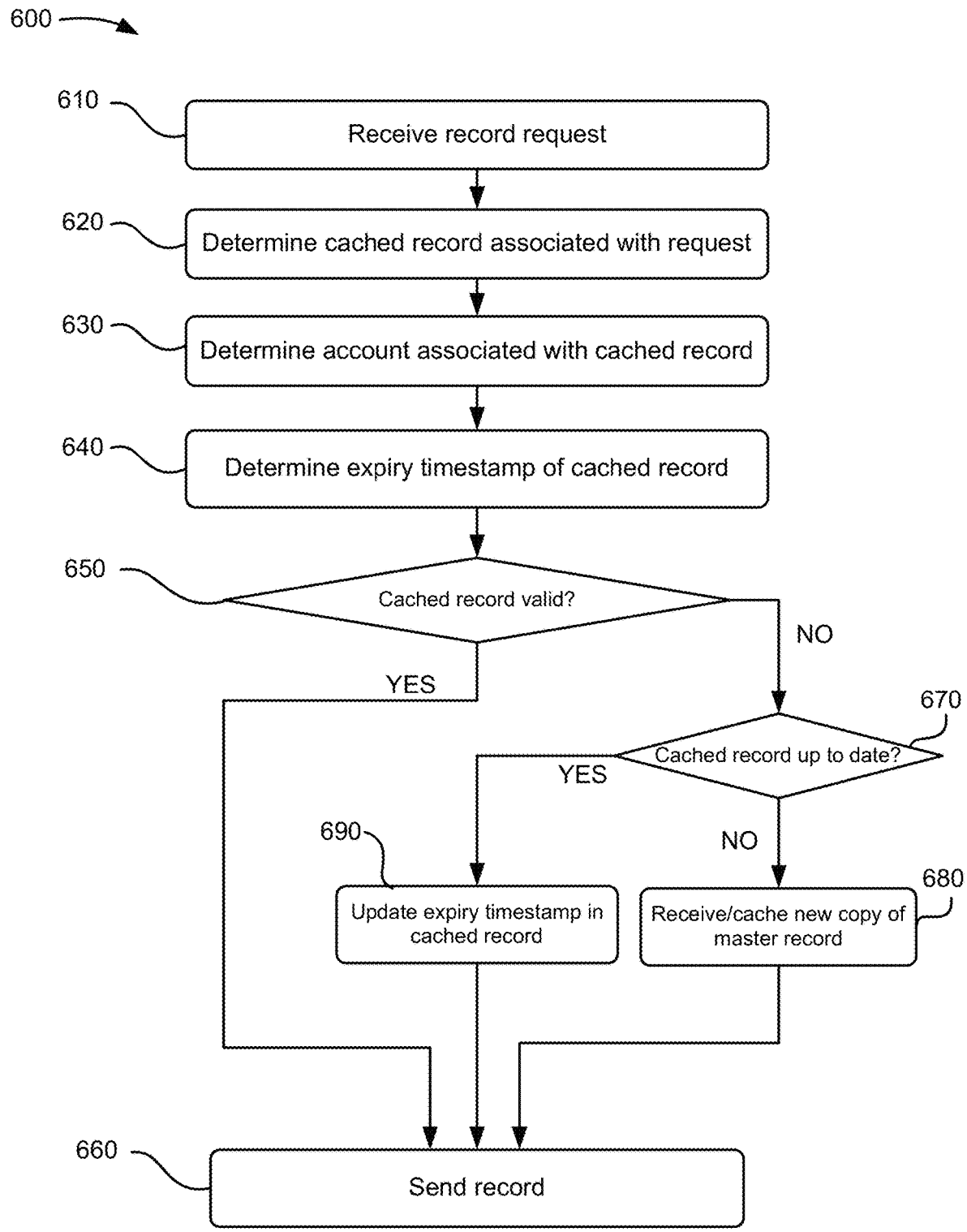
FIG. 6 illustrates a flowchart of an example process for processing a record request.

FIG. 6 illustrates a flowchart of an example process 600 for validating and/or updating a cached record against corresponding master record, in response to processing a record request. In one implementation, process 600 may be performed by one or more components of orchestration server 220, such as processing unit 305 of orchestration server 220. In another implementation, one or more blocks of process 600 may be performed by one or more components of another device (e.g., one or more of servers 230 and 240), or a group of devices including or excluding orchestration server 220.

As shown in FIG. 6, process 600 may include receiving a record request (block 610). For example, orchestration server 220 may receive a record request from user device 210 and/or some other device. As described above, a record request may include a request to receive a record in the context of obtaining information used to allow user device 210 to access content from a content provider server. Additionally, or alternatively, the record request may be in the form of a request from some other device to receive a record for some other purpose. In some implementations, a record request could include a request for a single record, or a request for multiple records.

Process 600 may further include determining the cached record associated with the request (block 620). For example, as described above with respect to data structure 500, orchestration server 220 may determine the cached record associated with the request based on a record ID associated with the record. Alternatively, orchestration server 220 may identify that a cached record does not exist, thereby initiating an instruction to receive and cache a copy of the corresponding master record.

Process 600 may also include determining an account associated with the cached record (block 630). For example, as described above with respect to module 410, orchestration server 220 may identify the account associated with the record request (e.g., platform accounts, partner accounts and/or some other account). In one implementation, orchestration server 220 may identify the account associated with the record request based on information stored in data structure 500, as described above with respect to FIG. 5.

Process 600 may further include determining an expiry timestamp of the cached record (block 640). For example, as described above, orchestration server 220 may identify the expiry timestamp associated with the cached record. In some implementations, the expiry timestamp may be stored by the cached record (e.g., embedded in a header of the cached record, and/or stored using some other technique). In one implementation, orchestration server 220 may identify the expiry timestamp associated with the record request based on information stored in data structure 500, as described above with respect to FIG. 5.

Process 600 may also include determining if the cached record is valid (block 650). For example, as described above with respect to module 430, orchestration server 220 may determine if the cached record is valid by comparing the timestamp associated with the record request with the expiry timestamp associated with the corresponding cached record.

If orchestration server 220 determines that the cached record is valid (block 650-YES), process 600 may include sending the record (block 660). For example, as described above with respect to module 450, orchestration server 220 may send the record in response to a request for the record. In the situation where the record request includes requests for multiple records, orchestration server 220 may aggregate, organize, and/or package the records in response to a record request. Orchestration server 220 may further send the aggregated records to user device 210 associated with the record request.

If, on the other hand, orchestration server 220 determines that the cached record is invalid (block 650-NO), process 600 may include determining if the cached record is up to date (block 670). For example, as described above with respect to module 440, orchestration server 220 may determine if the cached record, corresponding to the master record, is up to date (e.g., if the cached record created timestamp is up to date with respect to the corresponding master record timestamp).

If orchestration server 220 determines that the cached record is up to date (block 670-YES), process 600 may include updating the expiry timestamp in the cached record (block 690). For example, as described above with respect to module 450, orchestration server 220 may update the expiry timestamp of the cached record based on the timestamp of the record request and/or the TTL. In the situation where the cached record is up to date, orchestration server 220 may forgo communicating with servers 230-240 to receive a copy of the corresponding master record, thereby reducing network traffic associated with communicating with servers 230-240 to receive a copy of the corresponding master record. As described above, process 600 may further include sending the record (block 660).

If, on the other hand, orchestration server 220 determines that the record is not up to date (block 670-NO), process 600 may include receiving/caching a new copy of the master record (block 680). For example, as described above with respect to module 450, orchestration server 220 may communicate with the server storing the corresponding master record (e.g., one or more of servers 230 and 240) to cache a new copy of a master record based on receiving the master record corresponding to the cached record. Additionally, or alternatively, orchestration server 220 may delete the out-of-date cached record and replace the out-of-date cached record with the newly-generated cached record corresponding to the master record. Additionally, or alternatively, the newly-generated cached record may include a created timestamp and/or an expiry timestamp as described above. Process 600 may further include sending the record (block 660), as described above.

As described above, user device 210 may receive the record associated with a record request in order to access a content provider server (e.g., content provider server 250). For example, the record may include information, such as authentication information, billing information, and/or some other information to authorize user device 210 to receive content (e.g., audio, video, images, documents, etc) from a content provider server, such as content provider server 250.

Figure 7A:
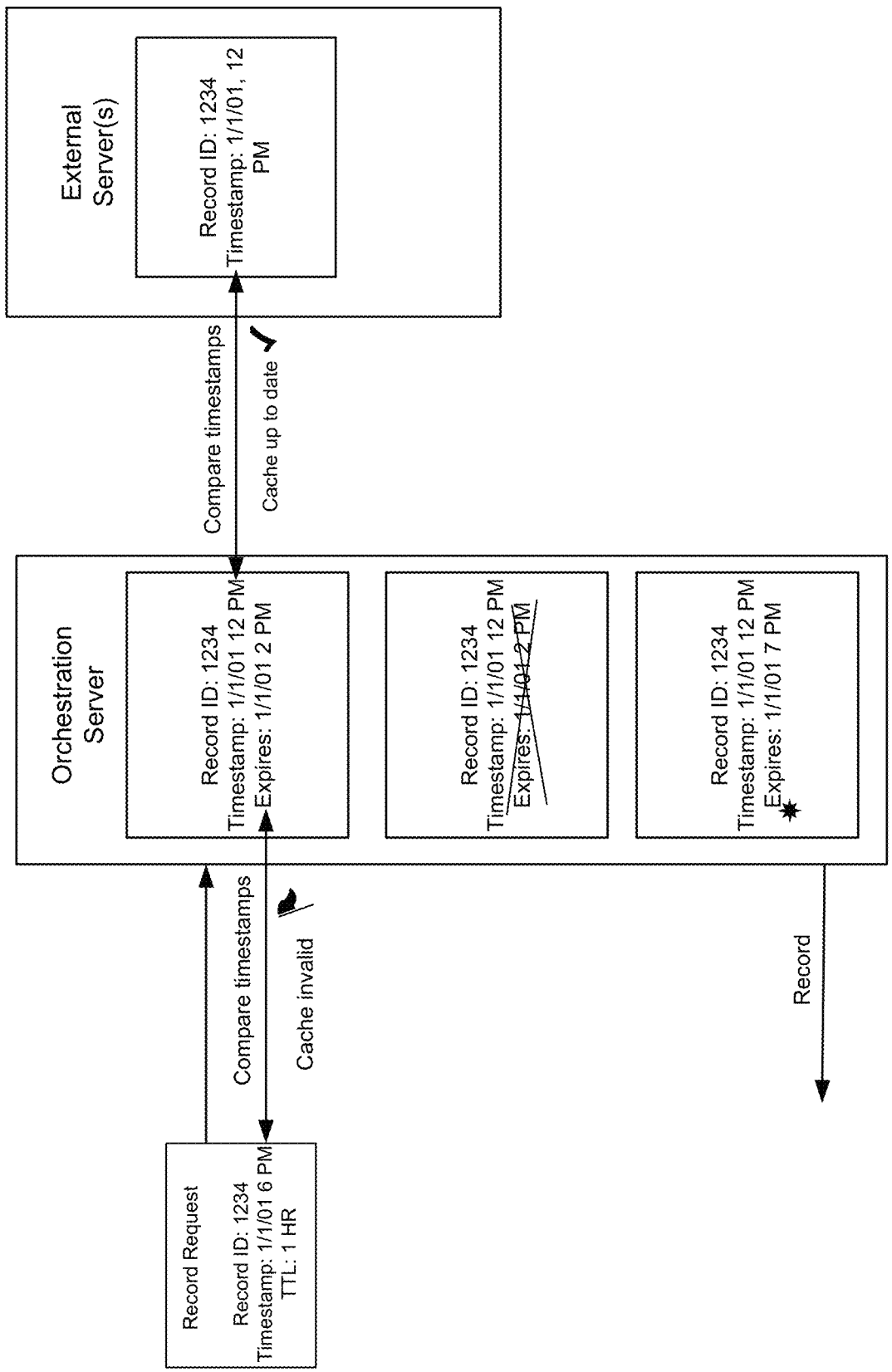
Figure 7C:
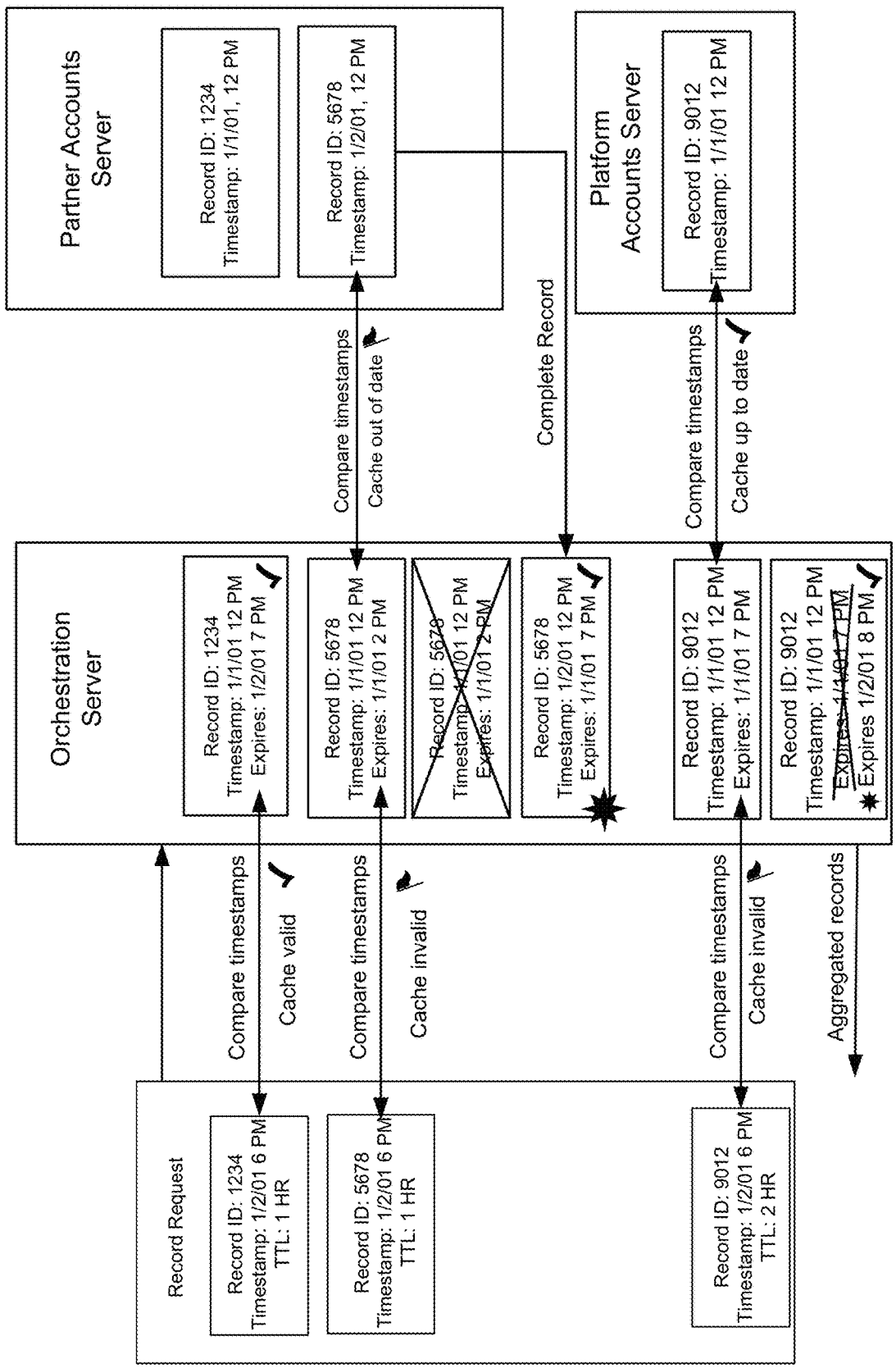

FIGS. 7A-7C are diagrams illustrating example implementations described herein. As shown in FIG. 7A, assume that orchestration server 270 has received a record request from user device 210. As described above, the record request may include a record ID (e.g., "1234"), a timestamp (e.g., 1/1/01, 6 PM) and a TTL value (e.g., 1 hour). Assume that, orchestration server 220 determines that the cached record is invalid (e.g., by determining that the timestamp of the record request (e.g., 1/1/01, 6 PM) is after the expiry timestamp of the cached record (e.g., 1/1/01, 2 PM)). Based on determining that the cached record is invalid, orchestration server 220 may communicate with one or more external servers (e.g., servers-230 and 240) to determine if the cached record, associated with the master record, is up to date. In the example shown in FIG. 7A, orchestration server 220 may determine that the cached record is up to date (e.g., by determining that the created timestamp of the master record (e.g., 1/1/01, 12 PM) is not after the created timestamp of the cached record (e.g., 1/1/01, 12 PM)). In this case, orchestration server 220 may forgo communicating with the external server(s) to receive a copy of the corresponding master record, thereby reducing network traffic. Orchestration server 220 may update the expiry timestamp of cached record based on the timestamp associated with the record request and/or the TTL associated with the record request (e.g., updated from 1/1/01, 12 PM, to 1/1/01, 7 PM). Additionally, orchestration server 220 may transmit the record to user device 210.

In the example shown in FIG. 7B, assume that orchestration server 220 has received a record request from user device 210. As described above, orchestration server 220 may determine that the cached record is valid by determining that the timestamp associated with the record request (e.g., 1/1/01, 1 PM) is before the expiry timestamp associated with the cached record (1/1/01, 2 PM). In this case, orchestration server 220 may send the record, associated with the record request, and forgo communicating with servers 230 and 240, thereby reducing network traffic.

In as the example shown in FIG. 7C, assume that orchestration server 220 has received a record request from user device 210. Further assume that the record request includes requests for three records (e.g., record 1234, record 5678, and record 9012), as shown in FIG. 7C. As described above, orchestration server 220 may validate each cached record associated with the request, and determine if invalid cached records are up to date with respect to the corresponding master record. For example, orchestration server 220 may validate cached record 1234 (e.g., by determining that the timestamp of the record request (e.g., 1/2/01, 6 PM), is before the expiry timestamp of the cached record (e.g., 1/2/01, 7 PM)) and forgo communicating with servers 230-240 to receive a copy of the master record associated with the cached record.

As further shown in FIG. 7C, orchestration server 220 may determine that cached record 5678 is invalid (e.g., by determining that the timestamp of the record request (e.g., 1/2/01, 6 PM) is after the expiry timestamp of the cached record (e.g., 1/1/01, 2 PM). Additionally, orchestration server 220 may determine that cached record 5678 is out of date with respect to the corresponding master record (e.g. by determining that the timestamp of the master record (e.g., 1/2/01, 12 PM), is after the created timestamp of the cached record (e.g., 1/1/01, 12 PM)). Orchestration server 220 may delete the out-of-date cached record and communicate with servers 230-240 to cache a new copy of the corresponding master record. Additionally, the newly cached copy may include a created timestamp based on the timestamp of the corresponding master record, and/or an expiry timestamp based on the TTL and/or the timestamp of the record request, as described above.

As further shown in FIG. 7 C, orchestration server 220 may determine that cached record 9012 is invalid (e.g., by determining that the timestamp of the record request (e.g., 1/02/01, 6 PM) is after the expiry timestamp of the cached record (e.g., 1/1/01, 7 PM)). Orchestration server 220 may further determine that cached record 9012 is up to date with respect to the corresponding master record (e.g., by determining that the timestamp of the master record (e.g., 1/1/01, 12 PM), is not after the created timestamp of the cached record (e.g., 1/1/01, 12 PM)). Orchestration server 220 may update the expiry timestamp based on the TTL and/or the timestamp of the record request, as described above.

Additionally, or alternatively, orchestration server 220 may keep valid cached records unchanged, update expiry timestamps for invalid but up-to-date cached records, and/or replace invalid and out-of-date cached records with a new copy of the corresponding master record. Additionally, or alternatively, orchestration server 220 may aggregate the cached records associated with the request (e.g., by marking the valid and/or up-to-date cached records) and sending the aggregated records to user device 210.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 6, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method comprising:
  receiving, by an orchestration server, a request, from a user device, for a first record stored by a cache of the orchestration server,
    the first record including information that indicates whether the user device is permitted to access or receive content from a content provider server;
  determining, by the orchestration server, an expiry timestamp embedded in a header of the first record, the expiry timestamp being based on a cached record timestamp of the first record and a time to live (TTL) value, the cached record timestamp indicating when the first record was created or changed, and the TTL value being set based on optimizing use of a network between the orchestration server and an accounts server;

comparing, by the orchestration server, the expiry timestamp of the first record to a timestamp of the request;

determining, by the orchestration server, that the first record is invalid based on comparing the expiry timestamp of the first record to the timestamp of the request;

determining, by the orchestration server and based on determining that the first record is invalid, whether the first record is out of date with respect to a second record stored by the accounts server by comparing the cached record timestamp of the first record and a timestamp of the second record;

updating, by the orchestration server, the first record with information from the second record to form an updated first record when the first record is out of date; and sending the updated first record to the user device associated with the request, the updated first record being used to permit the user device to access or receive the content from the content provider server.

2. The method of claim 1, where determining whether the first record is out of date with respect to the second record includes:

identifying that the first record is up to date based on comparing the cached record timestamp of the first record with the timestamp of the second record, and where the method further comprises:

updating the expiry timestamp associated with the first record based on identifying that the first record is up to date and based on the TTL value.

3. The method of claim 1, where the cache stores a plurality of records, where the plurality of records include the first record, and where the TTL value is defined per record for each of the plurality of records.

4. The method of claim 1, where updating the first record with the information from the second record when the first record is out of date includes:

replacing the first record with a copy of the second record to form the updated first record, where the updated first record includes a created timestamp corresponding to a time when the updated first record is formed, and where the orchestration server is capable of using the created timestamp to validate the updated first record.

5. The method of claim 1, further comprising:

receiving a request for a third record, the request for the first record further including the request for the third record and a timestamp associated with the third record;

determining that the third record is invalid based on the timestamp associated with the third record;

determining whether the third record is out of date with respect to a fourth record stored by a partner accounts server based on determining that the third record is invalid;

updating the third record with information from the fourth record to form an updated third record when the third record is out of date; and aggregating the updated first record and the updated third record to form an aggregated record, where sending the updated first record to the user device includes sending the aggregated record.

6. The method of claim 5, where the accounts server is associated with a different party than the partner accounts server.

7. The method of claim 1, where determining that the first record is invalid comprises:

determining that the timestamp of the request is after the expiry timestamp of the first record, and determining that the first record is invalid based on determining that the timestamp of the request is after the expiry timestamp of the first record.

8. A system comprising:

one or more devices, implemented in hardware, to:

receive a request, from a user device, for a first record stored by a cache associated with the one or more devices;

the first record including information that indicates whether the user device is permitted to access or receive content from a content provider server;

determine a first timestamp associated with the first record, the first timestamp being an expiry timestamp, the expiry timestamp being based on a cached record timestamp of the first record and a time to live (TTL) value, the cached record timestamp indicating when the first record was created or changed, the TTL value being set to reduce network traffic associated with an accounts server group;

compare the expiry timestamp of the first record to a timestamp of the request;

determine that the first record is invalid based on comparing the first timestamp associated with the first record to the timestamp associated with the request;

determine, based on determining that the first record is invalid, whether the first record is out of date with respect to a second record stored by the accounts server group by comparing a second timestamp of the first record and a timestamp of the second record, the second timestamp being the cached record timestamp of the first record, and the second timestamp indicates when the first record was created;

update the first record with information from the second record to form an updated first record when the first record is out of date; and send the updated first record to the user device associated with the request, the updated first record being used to permit the user device to access or receive the content from the content provider server.

9. The system of claim 8, where, when determining whether the first record is out of date with respect to the second record, the one or more devices are to:

identify that the first record is up to date based on comparing the second timestamp of the first record with the timestamp of the second record, and where the one or more devices are further to:

update the first timestamp associated with the first record based on identifying that the first record is up to date and based on the TTL value.

10. The system of claim 8,
where the cache stores a plurality of records, and
where the plurality of records include the first record, and
where the TTL value is defined per record for each of the plurality of records.

11. The system of claim 8, where, when updating the first record with information from the second record, the one or more devices are to:
replace the first record with a copy of the second record to form the updated first record,
the updated first record including a third timestamp corresponding to the timestamp associated with the second record, and
use the third timestamp to validate the updated first record.

12. The system of claim 8,
where the one or more devices are further to:
receive a request for a third record,
the request for the first record further including the request for the third record and a third timestamp associated with the third record;
determine that the third record is invalid based on the third timestamp;
determine that the third record is out of date with respect to a fourth record stored by the accounts server group based on determining that the third record is invalid;
update the third record with information from the fourth record to form an updated third record when the third record is out of date; and
aggregate the updated first record and the updated third record to form an aggregated record, and
where the one or more devices, when sending the updated first record to the user device, are to send the aggregated record.

13. The system of claim 12,
where the accounts server group includes a first server and a second server,
where the first server stores the second record, and
where the second server stores the third record.

14. The system of claim 8, where the request is further for a third record.

15. A non-transitory computer-readable medium storing instructions, the instructions comprising:
a plurality of instructions which, when executed by one or more processors of a first server, cause the one or more processors to:
receive a request, from a user device, for a first record stored by a cache associated with the first server,
the first record including information that indicates whether the user device is permitted to access or receive content from a content provider server;
determine a first timestamp associated with the first record based on information in a data structure stored in a memory of the first server,
the first timestamp being an expiry timestamp,
the expiry timestamp being based on a cached record timestamp of the first record and a time to live (TTL) value,
the cached record timestamp indicating when the first record was created or changed,
the TTL value being set to reduce network traffic associated with an accounts server group;
compare the expiry timestamp of the first record to a timestamp of the request;
determine that the first record is invalid based on comparing the cached record timestamp associated with the first record to the timestamp of the request;
determine, based on determining that the first record is invalid, whether the first record is out of date with respect to a second record stored by the accounts server group by comparing a second timestamp of the first record with and a timestamp of the second record,
the second timestamp being the cached record timestamp of the first record, and
the accounts server group including a plurality of servers;
update the first record with information from the second record to form an updated first record when the first record is out of date; and
send the updated first record to the user device associated with the request,
the updated first record being used to permit the user device to access or receive the content from the content provider server.

16. The non-transitory computer-readable medium of claim 15,
where one or more instructions, of the plurality of instructions, to determine whether the first record is out of date with respect to the second record include:
one or more instructions which, when executed by the one or more processors, cause the one or more processors to:
identify that the first record is up to date based on comparing the second timestamp of the first record with the timestamp of the second record, and
where the instructions further include:
one or more instructions which, when executed by the one or more processors, cause the one or more processors to:
update the first timestamp associated with the first record based on identifying that the first record is up to date and based on the TTL value.

17. The non-transitory computer-readable medium of claim 15,
where the cache stores a plurality of records,
where the plurality of records include the first record, and
where the TTL value is defined per record for each of the plurality of records.

18. The non-transitory computer-readable medium of claim 15, where one or more instructions, of the plurality of instructions, to update the first record with information from the second record when the first record is out of date include:
one or more instructions which, when executed by the one or more processors, cause the one or more processors to:
replace the first record with a copy of the second record to form the updated first record,
the updated first record including a third timestamp corresponding to the timestamp associated with the second record, and
the first server being capable of using the third timestamp to validate the updated first record.

19. The non-transitory computer-readable medium of claim 15,
where the plurality of instructions further cause the one or more processors to:
receive a request for a third record,
where the request for the first record further includes the request for the third record and a third timestamp associated with the third record;

determine that the third record is invalid based on the third timestamp;

determine that the third record is up to date with respect to a fourth record stored by the accounts server group, based on determining that the third record is invalid;

update the third timestamp associated with the third record to form an updated third record based on determining that the third record is up to date; and aggregate the updated first record and the updated third record to form an aggregated record, and where one or more instructions, of the plurality of instructions, to send the updated first record to the user device include one or more instructions to send the aggregated record.

20. The non-transitory computer-readable medium of claim 15, where the plurality of instructions further cause the one or more processors to:

receive a request for a third record,
where the request for the first record further includes the request for the third record and a third timestamp associated with the third record;

determine that the third record is valid based on the third timestamp; and aggregate the updated first record and the third record to form an aggregated record, and where one or more instructions, of the plurality of instructions, to send the updated first record to the user device include one or more instructions to send the aggregated record.

21. The non-transitory computer-readable medium of claim 15, where one or more instructions which, when executed by the one or more processors, cause the one or more processors to:

delete the first record that is out of date after replacing the first record with the updated first record.

* * * * *